(No Model.)

J. M. W. LONG.
LUBRICATOR.

No. 326,998. Patented Sept. 29, 1885.

Witnesses:  John M. W. Long  Inventor
  by James W. See  Attorney

UNITED STATES PATENT OFFICE

JOHN M. W. LONG, OF HAMILTON, OHIO.

LUBRICATOR.

SPECIFICATION forming part of Letters Patent No. 326,998, dated September 29, 1885.

Application filed July 25, 1885. (No model.)

*To all whom it may concern:*

Be it known that I, JOHN M. W. LONG, of Hamilton, Butler county, Ohio, have invented certain new and useful Improvements in Lubricators, of which the following is a specification.

This invention pertains to tallow cups or lubricators for use in connection with steam-engines and the like. There is a class of lubricators in which the lubricating material is contained within a cylindrical cup and pressed upon by a spring-loaded piston fitted to be adjusted by means of a screw.

My invention relates to certain improvements in the construction of lubricators of this class, as will be readily understood from the following description, taken in connection with the accompanying drawings, in which—

Figure 1:
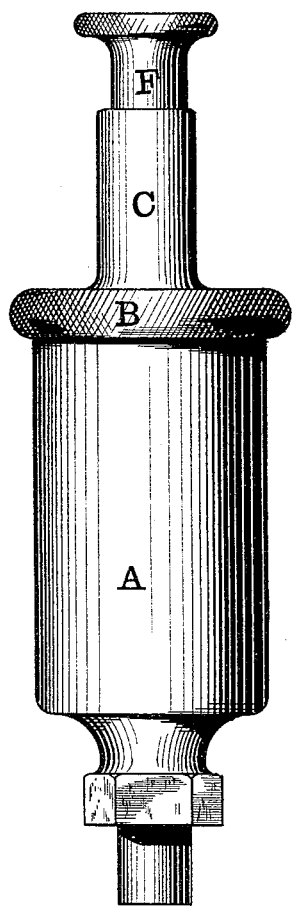
Figure 2:
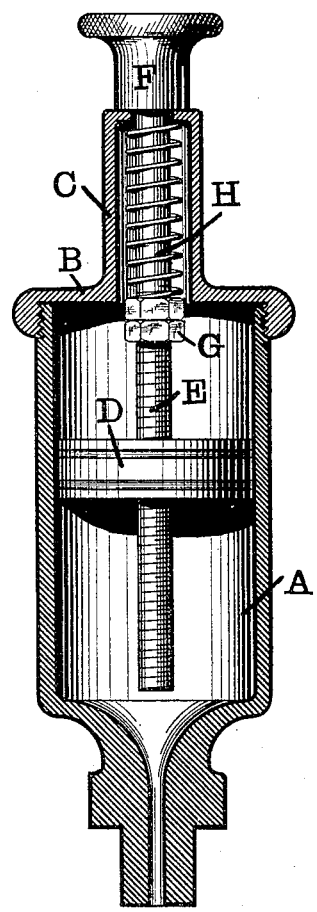

Figure 1 is an elevation, and Fig. 2 a vertical section, of a lubricator embodying my improvements.

In the drawings, A represents a cylindrically-bored cup provided with a shank adapted to be threaded, so as to be inserted into a steam-chest, steam-pipe, or other proper thing to be lubricated; B, a removable cap attached to the top of the cup, as by being screwed thereon; C, a hollow boss formed upon and projecting upward from the top of the cup and arranged in the line of the axis of the bore of the cup; D a piston, fitting within the bore of the cup and having an axial hole threaded for a stem; E, a threaded stem screwed through the piston and continuing upward through and out of the top of the boss of the cap; F, a handle-like head secured to the upper end of the stem; G, a pair of lock-nuts forming an adjustable upwardly-facing shoulder upon the stem; and H, a helical spring surrounding the stem above the lock-nuts, against which its lower end presses, and abutting with its upper end against an internal shoulder at the top of the boss of the cap.

The piston is to be provided with packing, and should so fit the bore of the cup as to prevent the passage by it of the lubricating material below it, and it should be at liberty to reciprocate nicely within the bore of the cup. The stem and piston are capable of a free vertical motion, the stem sliding freely through the top of the boss of the cap, the tendency of the spring being, obviously, to press the stem downward as far as the head of the stem will permit. The lock-nut may be adjusted upon the stem so as to alter the compression of the spring. If the stem be turned by revolving its head with the fingers, the piston may be adjusted upward or downward upon the stem, the friction of the piston against the walls of the cup being sufficient to prevent the piston from revolving with the stem.

In operation the cap is unscrewed and removed, carrying with it the stem and piston. The cup is then filled as full as desired with tallow or other lubricating material. The piston is then screwed upward upon the stem as far as the lock-nuts will permit, after which the parts are put in place. The head of the stem is then revolved, thus causing the piston to move downward upon the stem. When the piston presses upon the lubricating material, it will not freely move downward any farther, and consequently the continued screwing of the stem serves to elevate the stem and compress the spring. In this condition the head of the stem will stand above the boss of the cap, and the piston will be pressed downward upon the lubricating material by the spring. This pressure of the spring serves to constantly expel the lubricating material from the cup, and when the piston is moved downward so far as to exhaust the spring the stem may be screwed upward again, and again compress the spring. In this manner the piston may be moved downward upon the stem at each exhaustion of the spring, and the effect of the spring upon the piston may be at any time adjusted by manipulating the stem so as to compress the spring more or less.

The lock-nuts may be adjusted to alter the normal compression of the spring.

I claim as my invention—

1. In a lubricator, the combination of a cylindrically-bored cup, a piston fitted to reciprocate therein, a stem screwed through the piston and provided with an upwardly-facing shoulder and with a head by which it may be rotated, a cap serving to close the cup and to furnish a guide for the upper end of the stem, and a spring engaging the shoulder of the stem and abutting against the cap, substantially as and for the purpose set forth.

2. In a lubricator, the combination of the cylindrically-bored cup A, the cap B, screwed thereon and provided with an upwardly-projecting hollow boss, C, having an inner shoulder at its top, the piston D, fitting within the bore of the cup and having a threaded axial hole, the stem E, screwed through the piston and projecting through the top of said boss, the handle-like head F, secured to the top of the stem, the lock-nuts G upon the thread of the stem, and the helical spring H, surrounding the stem and engaging the lock-nuts and the inner shoulder of the boss, substantially as and for the purpose set forth.

JOHN M. W. LONG.

Witnesses:
C. E. McBETH,
W. A. SEWARD.